United States Patent
Wahlström et al.

(10) Patent No.: US 8,352,127 B2
(45) Date of Patent: Jan. 8, 2013

(54) CONTROL SYSTEM AND WORKING MACHINE COMPRISING THE CONTROL SYSTEM WITH ELECTRONIC SAFETY DEVICE

(75) Inventors: Patrik Wahlström, Västerås (SE); Bo Vigholm, Stora Sundby (SE)

(73) Assignee: Volvo Construction Equipment AB, Eskilstuna (SE)

( * ) Notice: Subject to any disclaimer, the term of this patent is extended or adjusted under 35 U.S.C. 154(b) by 217 days.

(21) Appl. No.: 12/919,816

(22) PCT Filed: Mar. 11, 2008

(86) PCT No.: PCT/SE2008/000189
§ 371 (c)(1),
(2), (4) Date: Aug. 27, 2010

(87) PCT Pub. No.: WO2009/113917
PCT Pub. Date: Sep. 17, 2009

(65) Prior Publication Data
US 2011/0010055 A1    Jan. 13, 2011

(51) Int. Cl.
*B62D 12/00* (2006.01)
(52) U.S. Cl. ............... 701/42; 701/43; 701/50
(58) Field of Classification Search .......... 701/36, 701/42, 43, 45, 49, 50; 340/439; 172/4.5, 172/9
See application file for complete search history.

(56) References Cited

U.S. PATENT DOCUMENTS

| | | | |
|---|---|---|---|
| 5,996,725 A | 12/1999 | Nishino et al. | |
| 6,028,524 A * | 2/2000 | Hartman et al. | 701/50 |
| 7,881,841 B2 * | 2/2011 | Dattilo et al. | 701/42 |
| 2002/0177932 A1 * | 11/2002 | Kifuku et al. | 701/41 |
| 2005/0139412 A1 * | 6/2005 | Vigholm | 180/418 |
| 2006/0137931 A1 | 6/2006 | Berg et al. | |
| 2006/0218909 A1 | 10/2006 | Khalil et al. | |
| 2007/0017730 A1 | 1/2007 | Beck et al. | |
| 2007/0209356 A1 * | 9/2007 | Graeve et al. | 60/422 |
| 2011/0035112 A1 * | 2/2011 | Huang et al. | 701/42 |

FOREIGN PATENT DOCUMENTS

| | | |
|---|---|---|
| EP | 0631922 A2 | 1/1995 |
| WO | 03099637 A1 | 12/2003 |

OTHER PUBLICATIONS

Supplementary European Search Report (Jul. 6, 2012) European Application No. EP 08 72 4121.
International Search Report for corresponding International Application PCT/SE2008/000189.
International Preliminary Report on Patentability for corresponding International Application PCT/SE2008/000189.

* cited by examiner

*Primary Examiner* — Gerald McClain
(74) *Attorney, Agent, or Firm* — WRB-IP LLP

(57) ABSTRACT

A control system for a working machine includes a device for changing direction of the working machine, an operator controlled lever, and an electronic control unit adapted to receive an input signal indicative of desired direction from the position of the operator controlled element and to generate an output signal for producing a change of direction of the working machine, corresponding to the position of the operator controlled element, via said device. The control system includes an electronic safety device adapted to be controlled by the position of the operator controlled element and adapted to allow control of the device via the output signal and to block control of the device via the output signal, respectively, depending on the position of the operator controlled element.

19 Claims, 4 Drawing Sheets

CONTROL SYSTEM AND WORKING MACHINE COMPRISING THE CONTROL SYSTEM WITH ELECTRONIC SAFETY DEVICE

BACKGROUND AND SUMMARY

The present invention relates to a control system for a working machine, comprising a device for changing direction of the working machine, an operator controlled element and an electronic control unit adapted to receive an input signal indicative of desired direction from the position of the operator controlled element and to generate an output signal for producing a change of direction of the working machine, corresponding to the position of the operator controlled element, via said device. The operator controlled element is preferably constituted of a steering lever.

Such a control system is found, for example, in different types of articulated working machines comprising a front and a rear frame, said frames each carrying at least one wheel axle. The frames are articulately connected to each other via a vertical axis and the frames are pivotally mounted relative to each other about said joint via two hydraulic cylinders arranged between the two sections. A loading machine, such as a wheel loader or a dumper, is an example of such a working machine.

Below, the invention will be described for the case when the control system is arranged in a wheel loader for controlling its steering cylinders. This is to be regarded as a by no means limiting example within the field of application of the invention.

Traditionally, the device for changing direction of the working machine comprises a hyDraulic system adapted to control the movement of the hydraulic cylinders via control valves.

The steering in a wheel loader has high security requirements. As a rule, a wheel loader has a conventional steering wheel control, but can in parallel also be equipped with a lever control. The steering wheel is used during transport, and the lever is used for work at lower speeds such as, for example, when loading a dumper or truck, this in order to increase the operator's comfort. Accordingly, the operator uses the steering lever to request steering direction and steering speed.

The control system is usually designed such that the operator, by means of the steering wheel control, mechanically regulates a hydraulic valve which, in its turn, transfers hydraulic power to the steering cylinders. The lever control also transfers hydraulic power to the steering cylinders, but its hydraulic valve is normally controlled by electrical signals, that is to say the operator tilts the lever, which in its turn generates an electrical signal. In certain cases, it is desired to manipulate the electrical signal from the lever, which can be done by transferring the signals from lever to hydraulic valve via the control unit (machine computer). Examples of this are ramp elements (filters) and a steering speed which is depending on the speed of the machine, with the purpose of obtaining a smooth control in a loading operation, but still a directionally stable (non-wobbling) steering during transport.

In order to increase the safety, the control system can be designed such that the steering wheel control has the highest priority, that is to say, if the steering wheel and the lever are used at the same time, it is the steering wheel which is dominant.

Higher and higher demands are placed on the electronics for safety critical functions, such as the lever control, in the machine. The lever control with its electronics is a complex system with many sources of malfunction. A particular problem is that malfunctions can occur in the lever control (for example that steering takes place even if the lever is in a neutral position or the lever has locked in a certain position). Therefore, very high quality demands are placed on the machine computer and other electronics, which results in high costs.

It is desirable to produce a control system which offers a high safety in a cost efficient way. In particular, it is desirable to provide a control system which remedies the problem when malfunctions occur in the lever control (for example that steering takes place even if the lever is in a neutral position).

According to an aspect of the present invention, a control system comprises an electronic safety device adapted to be controlled by the position of the operator controlled element and adapted to allow control of the device via said output signal, and to block control of the device via said output signal, respectively, depending on the position of the operator controlled element.

According to one embodiment of the invention, the safety device comprises a control assembly arranged between the control unit and said device for changing direction in such a way that an output signal generated by the control unit is only allowed to pass when the output signal corresponds to the position of the operator controlled element.

The control assembly (for example comprising two relays) is then arranged on the lines for transferring the output signals to the device (for example in the form of a hydraulic circuit). By means of automatically opening and closing, respectively, the lines depending on the lever position, a safe system is obtained.

According to another embodiment, said electronic safety device comprises a means adapted to sense a first angular interval of the operator controlled element, said angular interval being associated with a first steering direction, and a second angular interval of the operator controlled element, said angular interval being associated with a second steering direction. In the safety device, the position of the operator controlled element is preferably sensed fully independently of the input signal to the control unit from the position of the operator controlled element. This means that the safety assembly becomes a parallel, independent system, relative to the traditional lever control. Preferably, said means for sensing said angular interval of the operator controlled element comprises a first switch associated with the first angular interval of the operator controlled element and a second switch associated with the second angular interval of the operator controlled element.

Further preferred embodiments and advantages of the invention are apparent from the following description.

BRIEF DESCRIPTION OF FIGURES

The invention will be described more closely in the following, with reference to the embodiments shown in the attached drawings, wherein.

DETAILED DESCRIPTION

Figure 1:
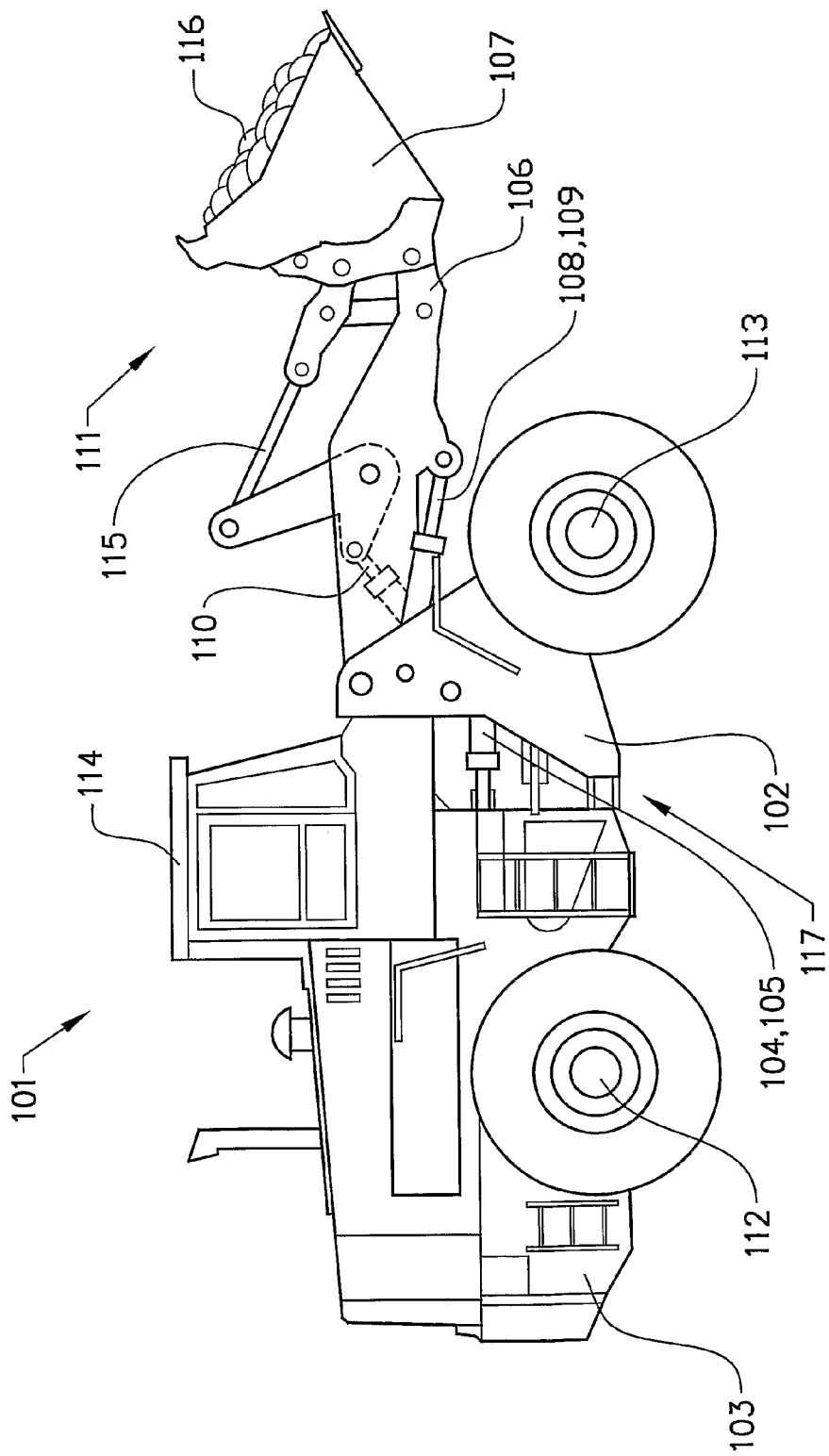
FIG. 1 shows a wheel loader in a side view.

FIG. 1 shows a side view of a wheel loader 101. The wheel loader 101 comprises a front vehicle section 102 and a rear vehicle section 103, said sections each comprising a frame and a pair of drive axles 112, 113. The rear vehicle section 103 comprises an operator's cab 114. The vehicle sections 102, 103 are connected to each other in such a way that they can be pivoted relative to each other about a vertical axis 117 by means of two hydraulic cylinders 104, 105 which are connected to the two sections. Accordingly, the hydraulic cylinders 104, 105 are disposed on different sides of a centre line in the longitudinal direction of the vehicle for steering, or turning the wheel loader 101, see also FIG. 2.

The wheel loader 101 comprises an equipment 111 for handling objects or material. The equipment 111 comprises a load-arm unit 106 and an implement 107 in the form of a bucket which is fitted on the load-arm unit. Here, the bucket 107 is filled with material 116. A first end of the load-arm unit 106 is pivotally connected to the front vehicle section 102 in order to achieve a lifting movement of the bucket. The bucket 107 is pivotally connected to a second end of the load-arm unit 106 in order to achieve a tilting movement of the bucket.

The load-arm unit 106 can be raised and lowered relative to the front section 102 of the vehicle by means of two hydraulic cylinders 108, 109, each of which is connected at one end to the front vehicle section 102 and at the other end to the load-arm unit 106. The bucket 107 can be tilted relative to the load-arm unit 106 by means of a third hydraulic cylinder 110, which is connected at one end to the front vehicle section 102 and at the other end to the bucket 107 via a link arm system 115.

Figure 2:
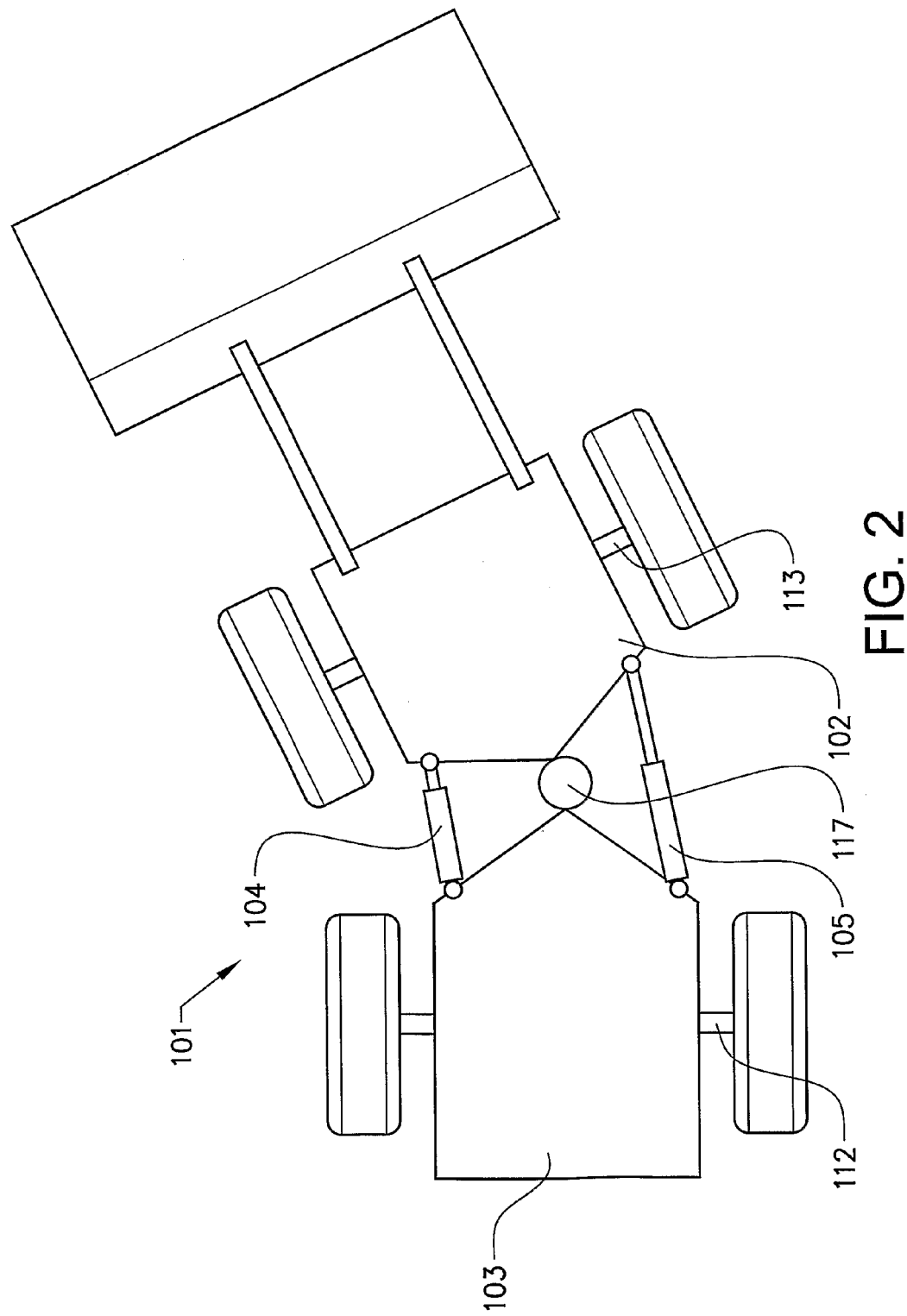
FIG. 2 schematically shows the wheel loader in a view from above.

In FIG. 2, the wheel loader 101 is shown in a schematic view from above. Here, the wheel loader is in a position where the vehicle sections 102, 103 are angled relative to each other about the joint 117.

Figure 3:
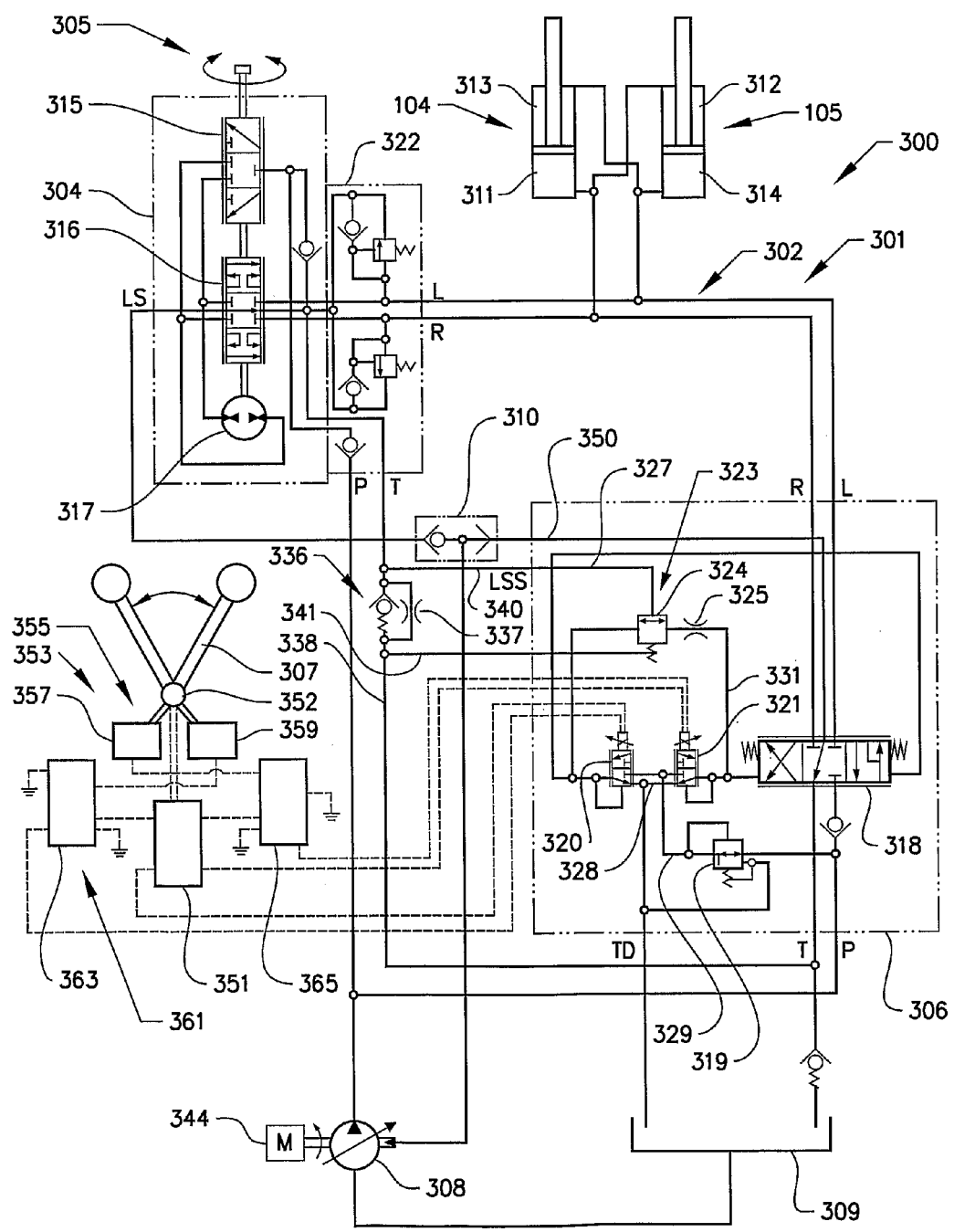
FIG. 3 shows a first preferred embodiment of a control system for controlling the wheel loader.

FIG. 3 shows a control system 300 for controlling the two hydraulic cylinders 104, 105 of the wheel loader 101. The lines marked with continuous lines designate hydraulic lines and the lines marked with dashed lines designate electronic lines. The control system 300 comprises a device 301 for changing direction of the working machine. The device 301, in its turn, comprises a hydraulic circuit 302.

The hydraulic circuit 302 comprises a first control valve unit 304, which is regulated mechanically by a first operator controlled element 305, in the form of the steering wheel of the vehicle. The hydraulic circuit 302 further comprises a second control valve unit 306, which is electronically controlled via a second operator controlled element 307, in the form of a steering lever. The steering lever 307 is shown in two tilted positions.

The system is load sensing (LS) and comprises a pump 308 with a variable displacement and a tank 309. The pump 308 is driven by the propulsion engine 344 of the vehicle, in the form of a diesel engine. The pump 308 senses the pressure (a LS signal) from the steering cylinders 104, 105 via a reversing valve 310 and via the control valve unit 304, 306 which is activated. The pump then sets a pressure which is a certain number of bars higher than the pressure of the steering cylinders. Thereby, there is an oil flow out to the steering cylinders 104, 105, the level of which depends on the extent to which the activated control valve unit 304, 306 is adjusted.

The hydraulic cylinders 104, 105 are arranged in such a way that the piston side 311 of the first hydraulic cylinder 104 and the piston rod side 312 of the second hydraulic cylinder 105 are connected to the pump 308 for steering the vehicle to the right, and that the piston rod side 313 of the first hydraulic cylinder 104 and the piston side 314 of the second hydraulic cylinder 105 are connected to the pump for steering the vehicle to the left.

The connection of the hydraulic cylinders 104, 105 to the pump 308 and thus the regulation of the hydraulic cylinders can be carried out either via steering wheel control by means of the control valve unit 304 or via lever control by means of the control valve unit 306.

The first control valve unit 304 comprises two valves, or slides, 315, 316, which are arranged one outside the other for rotation relative to one another. In the Figure, however, the slides 315, 316 are schematically illustrated for a linear displacement. The control valve unit 304 further comprises a hydraulic motor 317 which is adapted in such a way that the lower slide 316 in the Figure "hunts" the upper slide 315 in order to close the latter. When the operator turns the steering wheel, a certain quantity of oil is supplied to the control valve units, resulting in a certain output. The output is stopped when the lower slide 316 has caught up with the upper slide 315.

The second control valve unit 306 comprises a directional valve 318 which determines steering direction and also steering flow, and a pressure reducing valve 319 which ensures that the pilot pressure is limited to a determined level, irrespective of the pump pressure. The control valve unit 306 further comprises two electrically controlled valves 320, 321, which are regulated via an electrical signal from the steering lever 307. The electrical valves 320, 321 are arranged in parallel with one another on a line 328. The line 328 is further connected to the directional valve 318 on both of its sides for displacing it against spring force. The pump 308 is connected to the electrical valves 320, 321 via a line 329 connecting to the line 328 between the electrical valves. This means that an actuation of the right-hand valve 321, via the lever 307, produces an oil pressure on the directional valve 318 for displacing it to the right in the Figure against a spring force, and that an actuation of the left-hand electrical valve 320, via the lever 307, produces an oil pressure on the directional valve 318 for displacing. it to the left in the Figure against a spring force.

Accordingly, for steering to the right, the electrically controlled, right-hand valve 321 is actuated and then outputs an oil pressure, which is proportional to the electrical signal, to the directional valve 318. The higher the electrical signal (oil pressure) is, the more the directional valve 318 is adjusted and thereby a greater steering flow is obtained. Accordingly, for steering to the left, the electrically controlled, left-hand electrical valve 320 is actuated in a corresponding manner.

When the control valve unit 306 is not actuated, the LS signal from the reversing valve 310, see line 350, is connected to the tank 309 via the directional valve 318 and will thereby, in principle, become pressureless. The same applies for the first control valve unit 304 which also connects the LS signal to the tank 309 when it is not actuated. Thereby, the pump 308 is adjusted down and maintains only a low pressure. Accordingly, the two electrical valves 320, 321 are arranged in such a way that actuation of one of the valves results in a displacement of the directional valve 318 in one direction, and that actuation of the other valve results in a displacement of the directional valve 318 in the other direction.

In order to prevent negative pressure and pressures exceeding a determined maximum pressure in the system, the system comprises a top-up valve and a shock valve, which together are designated with the reference numeral 322. The function of the top-up valve and the shock valve is previously known and will therefore not be described more closely here.

The first control valve unit 304 and the second control valve unit 306 are arranged on parallel lines between the pump 308 and the hydraulic cylinders 104, 105. Depending on which operator controlled element the operator selects to control the vehicle with, that is to say the steering wheel 305 or the lever 307, the hydraulic cylinders 104, 105 are controlled by the control valve unit connected to the control means selected. The other control valve unit, which is connected to the operator controlled element not being used, is then set in an inactive position.

The system 1 further comprises a prioritizing means 323, which is adapted to ensure that the steering wheel control has the highest priority, that is to say if the steering wheel 305 and the lever 307 are used at the same time, the steering wheel is dominant, or has precedence. The prioritization is carried out completely hydraulically.

The prioritizing means 323 comprises a prioritizing valve in the form of a sequential valve 324 and a throttle 325. The sequential valve 324 is spring-biased and a line 327 is connected to the sequential valve 324, for opening the latter against the spring force by means of an oil pressure, and to the steering cylinder 104, 105 via the first control valve unit 304. When the first control valve unit 304 is in a neutral position, the sequential valve is not influenced, but when the first control valve unit 304 is displaced, by operating the steering wheel 305, the sequential valve 324 is connected into the pressure of the steering cylinder 104, 105, and the sequential valve then opens.

Furthermore, the sequential valve 324 is arranged on a line 331 connecting the two sides of the directional valve 318. More precisely, the sequential valve is arranged in parallel with the two electrical valves 320, 321 and is connected to the respective line out from these to the directional valve 318 in such a way that the sequential valve 324 opens, when it is charged with a sufficiently high pressure, and the pressure on the two sides of the directional valve 318 is equalized to a greater or lesser extent.

Accordingly, the prioritizing means 323 is adapted for sensing whether a flow occurs in the first control valve unit 304 for the steering wheel 305. When such a flow is registered, the prioritization is activated. The system comprises an element 336, connected to a hydraulic oil line, which is adapted to bring about a pressure difference on different sides of the prioritizing valve 324 for the purpose of displacing the latter. More precisely, the flow is registered as a pressure drop across a valve, in the form of a check valve 336. The check valve 336 is spring-biased, and has a certain, relatively low, opening pressure in order to cause a pressure drop, which is controlled by the spring. A throttle 337, which has the purpose of equalizing the pressure drop when the flow stops, is arranged in parallel with the check valve 336. The check valve 336 is arranged on a line 338 between the first control valve unit 304 and the tank 309, that is to say, after the control valve unit 304 (the outlet from the control valve unit) of the steering wheel 305. On both sides of the check valve 336, lines 340, 341 are connected to line 338, said lines 340, 341 further being connected to the sequential valve 324 for regulation of the latter.

The system comprises an electronic control unit 351 adapted to receive an input signal indicative of desired direction from the position of the steering lever 307 and to generate an output signal to said device 301 for producing a change of direction of the working machine corresponding to the position of the steering lever. The control unit 351 is adapted to generate an output signal to said electrical valves 320, 321. More precisely, the system comprises a means 352 adapted to register lever deflection and to generate corresponding signals to the control unit 351. This means 352 for registering lever deflection is, for example, constituted of double Hall sensors. According to an alternative, a potentiometer can be utilized.

The control system 300 further comprises an electronic safety device 353 adapted to be controlled by the position of the steering lever 307, and adapted to allow control of the device via said output signal and to block the control of the device via said output signal, respectively, depending on the position of the steering lever. More precisely, the safety device 353 is adapted to actuate the device independently of the output signal from the control unit 351. The safety device 353 is adapted to actuate said electrical valve 320, 321 directly.

The safety device 353 is adapted to block an actuation of the device 301 corresponding to a first steering direction of the working machine when the steering lever is set in a position which is not indicative of the first steering direction. Accordingly, the safety device 353 is arranged to block an actuation of the device corresponding to a first steering direction of the working machine when the steering lever is set in a position which is indicative of a second steering direction. In other words, when the steering lever is in a tilted position corresponding to the leftward steering direction, the device is blocked with respect to the rightward steering direction, and vice versa. The safety device 353 is further adapted to block an actuation of the device corresponding to a steering direction of the working machine, when the steering lever is set in a neutral position. This is explained more closely below.

The safety device 353 is adapted to disconnect the second electrical valve 321 when the position of the steering lever corresponds to the first steering direction, and to disconnect the first electrical valve 320 when the position of the steering lever corresponds to the second steering direction. The safety device 353 is adapted to disconnect both the first electrical valve 320 and the second electrical valve 321 when the steering lever is in a neutral position. The first and the second electrical valve 320, 321 are each solenoid actuated and the respective solenoid is connected to earth for said disconnection, se further explanation below.

The electronic safety device 353 comprises a means 355 adapted to sense a first angular interval of the steering lever, said angular interval being associated with a first steering direction, and a second angular interval of the steering lever, said angular interval being associated with a second steering direction. Said means 355 for sensing said angular interval of the steering lever is arranged separately from (and independently of) said means 352 for registering lever deflection. Said means 355 for sensing said angular interval of the steering lever comprises a first switch 357 associated with the first angular interval of the steering lever and a second switch 359 associated with the second angular interval of the steering lever. The switches 357, 359 are actuated mechanically by the steering lever deflection.

The electronic safety device 353 further comprises a control assembly 361 arranged between the control unit 351 and said device for changing direction in such a way that an output signal generated by the control unit is only allowed to pass when the output signal corresponds to the position of the steering lever. This control assembly 361 comprises means 363, 365 controlling opening and closing, respectively, of a respective communication line to the device, and said means 355 for sensing said angular interval of the steering lever is adapted to control the control means 363, 365 depending on the sensed angular interval. Said control means 361 comprises at least one relay 363, 365.

The intended function for increasing the safety of the lever 307 functionality is evident in principle in FIG. 3. When steering left, the switch 357 will release the relay 365, making steering to the right impossible (via the solenoid of the second electrically controlled valve 321). The relay 365 pulls the solenoid down to earth, disabling output. This makes the steering very resistant to disturbances with respect to EMC, and unexpected steering deflection in the wrong direction can be eliminated. When steering left, the switch 359 will pull the relay 363, which passes the pwm control action from the ECU 351 through to the solenoid of the first electrically controlled valve 320, and the steering takes place in the normal manner. With the lever 307 in intermediate position, both the solenoid of the second electrical valve 321 and the solenoid of the first electrically controlled valve 320 will be lowered to earth, disabling output in both directions.

Undesired steering deflection, and the fact that the function is fully operational, can be diagnosed by monitoring the switches 357, 359 with digital input signals on the ECU 351 and observing the returned pwm signals. As an example: if turning left, the switch 357 should release the relay 365, which in its turn will lower the solenoid of the second electrical valve 321 to earth. The returned pwm signal should in this case be zero. In this way, it is possible to safely state that no output to the right is possible. Monitoring of the same components should also take place when turning to the right, this in order to ensure that the switch, relay function and pwm signals change status and are fully operable. Malfunction of the switch can be diagnosed by verifying the return of the pwm signal, for example by sending a short pulse from the pwm output and verifying the return. Malfunctions of the relay can be diagnosed by verifying the position of the switch. Simultaneous diagnostics take place by means of the ECU, wherein also the position of the lever is collected and used. Diagnostics should take place continuously in the two directions of the lever and in the neutral position. Diagnostics should take place both when the lever is activated as well as when it is inactivated.

Figure 4:
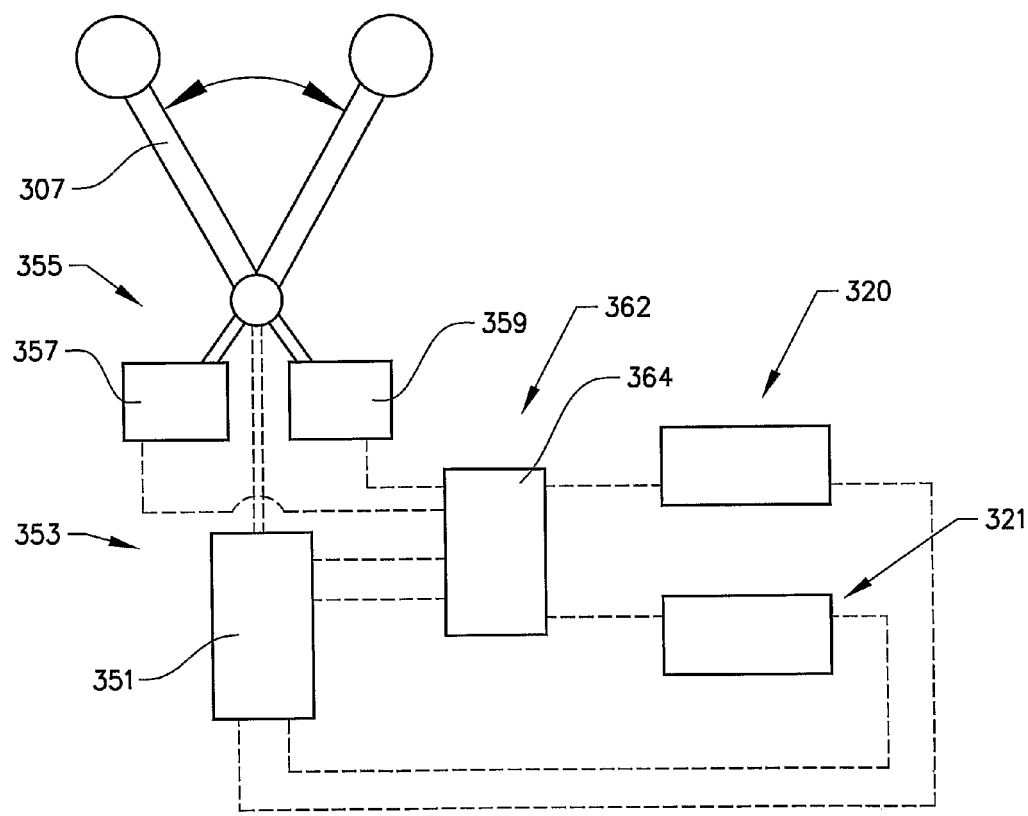
FIG. 4 shows an alternative embodiment of a safety device for lever control.

FIG. 4 shows an alternative control assembly 362 arranged between the control unit 351 and said device for changing direction. Here, solid lines designate electrical lines. More precisely, the relays 363, 365 are replaced with an electronic control circuit CPLD (Complex Programmable Logical Device) 364. With this circuit 364, opening and closing, respectively, for the pwm signals can be done in the same way as with the relays. CPLD is a programmable logic circuit, and it is preferably integrated in a future "safety ECU".

The invention should not be regarded as limited to the above-described exemplary embodiments, but a number of further variants and modifications are conceivable within the scope of the following claims. In certain cases, it is desired to manipulate the electrical signal from the lever (ramp elements, maximum levels, etc.), which can be done by transferring the signals from lever to hydraulic valve via a machine computer.

The above-mentioned device for changing direction, for instance, is not limited to a hydraulic circuit but can, for example, comprise a mechanical system or a combination of the two. Furthermore, the invention is not limited to frame-steered working machines/vehicles, but can also be utilized for working machines/vehicles with another steering technique, such as angling of the front wheels relative to the frame.

As an alternative to the operator controlled element preferably being constituted of a steering lever, or joy stick (which is adapted for a pivotal movement about a pivot joint), it can be constituted of a steering wheel (that is to say, an operator controlled element which is adapted for a rotational movement about a rotational axis). The switches are then adapted to sense the rotational direction of the steering wheel.

The invention claimed is:

1. Control system for a working machine, comprising
   a steering device for changing direction of the working machine,
   an operator controlled element for a steering direction of the working machine based on a position of the operator controlled element,
   an electronic control unit adapted to receive an input signal indicative of desired direction from the position of the operator controlled element and to generate an output signal for producing a change of direction of the working machine, corresponding to the position of the operator controlled element, via the steering device, and
   an electronic safety device adapted to be controlled by the position of the operator controlled element and adapted to allow control of the steering device via the output signal and to block control of the steering device via the output signal, respectively, depending on the position of the operator controlled element and independently of the output signal from the control unit (351).

2. Control system according to claim 1, wherein the safety device comprises a control assembly arranged between the control unit and the steering device for changing direction in such a way that an output signal generated by the control unit is only allowed to pass when the output signal corresponds to the position of the operator controlled element.

3. Control system according to claim 1, wherein the safety device is adapted to block an actuation of the steering device corresponding to a first steering direction of the working machine when the operator controlled element is set in a position which is not indicative of the first steering direction.

4. Control system according to claim 3, wherein the safety device is adapted to block an actuation of the steering device corresponding to a first steering direction of the working machine when the operator controlled element is set in a position which is indicative of a second steering direction.

5. Control system according to claim 3, wherein the safety device is adapted to block an actuation of the steering device corresponding to a steering direction of the working machine when the operator controlled element is set in a neutral position.

6. Control system according to claim 1, wherein the steering device comprises a hydraulic circuit adapted to supply a hydraulic actuator with a fluid for producing the change of direction of the working machine, and the hydraulic circuit comprises at least one electronically controlled control valve adapted to control the supply of the fluid to the hydraulic actuator based upon the output signal from the control unit.

7. Control system according to claim 6, wherein the hydraulic circuit comprises a first and a second directly electronically controlled valve arranged in hydraulic communication with the control valve and adapted to be controlled directly via the output signal from the control unit, and the first electrical valve is adapted to produce a first steering direction and the second electrical valve is adapted to produce a second steering direction.

8. Control system according to claim 7, wherein the safety device is adapted to disconnect the second electrical valve when the position of the operator controlled element corresponds to the first steering direction and to disconnect the first electrical valve when the position of the operator controlled element corresponds to the second steering direction.

9. Control system according to claim 8, wherein each of the first and the second electrical valve are solenoid actuated, and the respective solenoid is connected to ground for the disconnection.

10. Control system according to claim 7, wherein the safety device is adapted to disconnect both the first electrical valve and the second electrical valve when the operator controlled element is in a neutral position.

11. Control system according to claim 1 wherein the electronic safety device comprises means adapted to sense a first angular interval of the operator controlled element the angular interval being associated with a first steering direction, and a second angular interval of the operator controlled element, the angular interval being associated with a second steering direction.

12. Control system according to claim 11, wherein the means adapted to sense the first angular interval of the operator controlled element comprises a first switch associated with the first angular interval of the operator controlled element and a second switch associated with the second angular interval of the operator controlled element.

13. Control system according to claim 11, wherein the electronic safety device comprises control means for controlling the opening and closing, respectively, of a respective communication line to the steering device, and the means adapted to sense the first angular interval of the operator controlled element is adapted to control the control means depending on the sensed angular interval.

14. Control system according to claim 13, wherein the control means comprises a relay.

15. Control system according to claim 13, wherein one of the control means is arranged on each of two parallel communication lines to the steering device.

16. Control system according to claim 1, wherein the working machine comprises a first frame and a second frame, which are pivotally connected to each other via a pivot joint for allowing the change of direction.

17. Control system according to claim 16, wherein the control system comprises at least one hydraulic actuator arranged between the frame sections for producing the relative pivoting between the frame sections and thereby the change of direction.

18. Control system according to claim 1 anyone of the preceding claims, wherein the operator controlled element is constituted of an operator controlled lever.

19. Working machine comprising a control system according to claim 1.

* * * * *